United States Patent [19]

Cur et al.

[11] Patent Number: 5,018,328
[45] Date of Patent: May 28, 1991

[54] MULTI-COMPARTMENT VACUUM INSULATION PANELS

[75] Inventors: Nihat O. Cur; David B. Kirby, both of St. Joseph Township, Berrien County, Mich.

[73] Assignee: Whirlpool Corporation, Benton Harbor, Mich.

[21] Appl. No.: 451,830

[22] Filed: Dec. 18, 1989

[51] Int. Cl.$^5$ ............................ B32B 3/28; B32B 1/06
[52] U.S. Cl. ...................................................... 50/406
[58] Field of Search ............... 220/420, 421, 422, 423, 220/424; 52/406; 428/67, 68, 69, 118, 172, 336

[56] References Cited

U.S. PATENT DOCUMENTS

| | | |
|---|---|---|
| 2,768,046 | 10/1956 | Evans . |
| 2,779,066 | 1/1957 | Gaugler et al. . |
| 2,817,124 | 12/1957 | Dybvig ................................ 220/422 |
| 2,863,179 | 12/1958 | Gaugler et al. . |
| 2,989,156 | 6/1961 | Brooks et al. . |
| 3,108,706 | 10/1963 | Matsch ................................ 220/423 |
| 3,139,206 | 6/1964 | Matsch ................................ 220/423 |
| 3,151,364 | 10/1964 | Glaser ................................ 220/442 |
| 3,179,549 | 4/1965 | Strong et al. . |
| 3,199,715 | 8/1965 | Paivanas ............................. 220/424 |
| 3,264,165 | 8/1966 | Stickel . |
| 3,514,006 | 5/1970 | Molnar ................................ 220/423 |
| 4,000,246 | 12/1976 | Walles . |
| 4,444,821 | 4/1984 | Young et al. . |
| 4,529,638 | 7/1985 | Yamamoto et al. . |
| 4,662,521 | 5/1987 | Moretti . |
| 4,668,551 | 5/1987 | Kawasaki et al. . |
| 4,668,555 | 5/1987 | Uekado et al. . |
| 4,669,632 | 6/1987 | Kawasaki et al. . |
| 4,681,788 | 7/1987 | Barito et al. . |
| 4,683,702 | 8/1987 | Vis . |
| 4,702,963 | 10/1987 | Phillips et al. . |
| 4,726,974 | 2/1988 | Nowobilski . |

Primary Examiner—John E. Murtagh
Attorney, Agent, or Firm—Hill, Van Santen, Steadman & Simpson

[57] ABSTRACT

A vacuum insulation panel having flexible gas impermeable walls formed in multiple substantially adjacent compartments. A thermal break may advantageously be provided around the perimeter to prevent conduction of heat from a warmer side of the panel to a colder side, which thermal break can be easily constructed by utilizing webs of gas impermeable material with the foil carried thereon such that the foil has a width somewhat less than the width of the film and with two separate pieces of the firm rotated at 90° to one another to provide a continuous area void of the foil.

Multiple compartments are utilized to enhance the long term thermal characteristics of the panel by "protecting" the vacuum characteristics of at least one of the compartments by surrounding it with additional evacuated compartments. This results in a very minimal gas pressure gradient across the internal walls forming the internal compartment to minimize gas and vapor permeation into it thus greatly enhancing the lifetime of the panel. Further, this permits strategic placing of gettering materials such that gettering materials absorbing certain gases can be placed in the outer compartments and other gettering materials absorbing different gases can be placed in the internal compartments to enhance the lifetime of the panel.

18 Claims, 3 Drawing Sheets

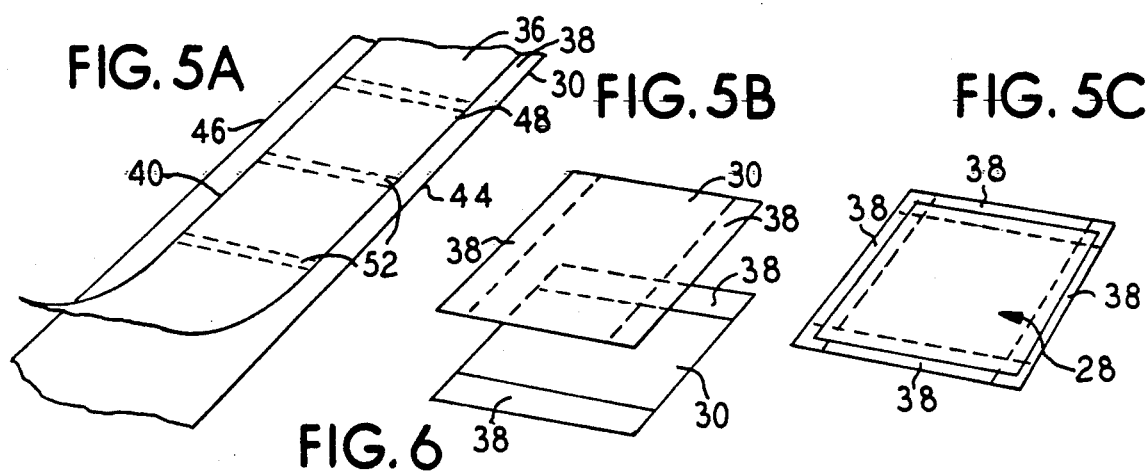
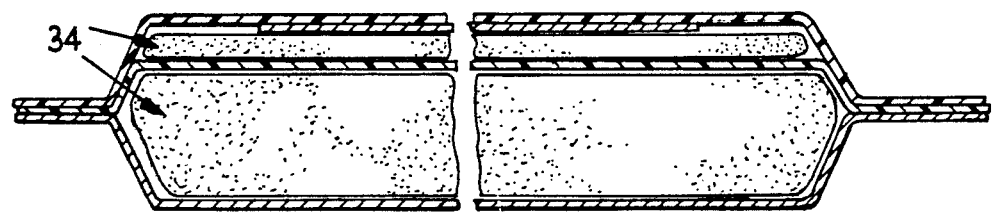
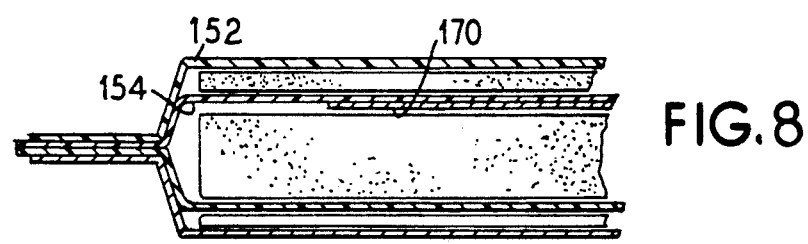

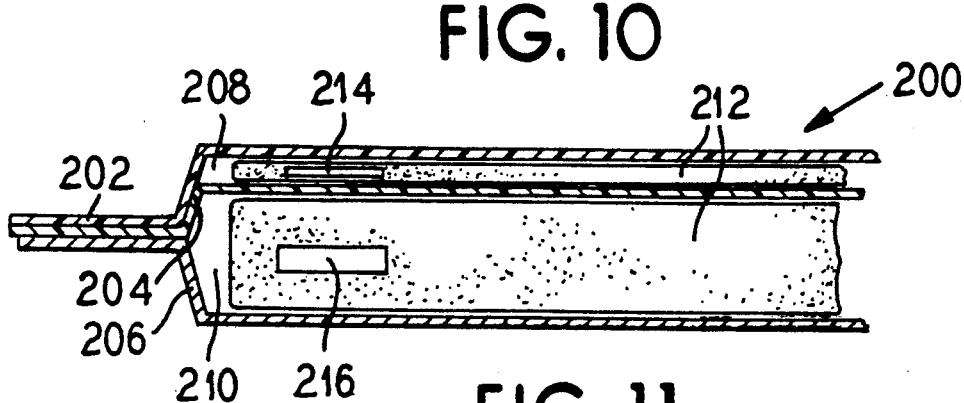
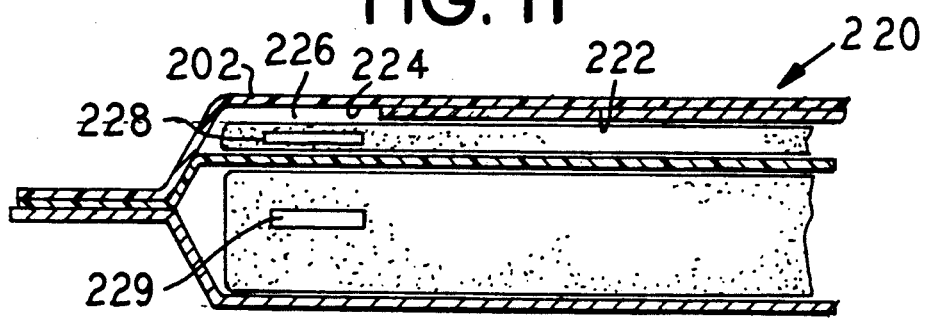
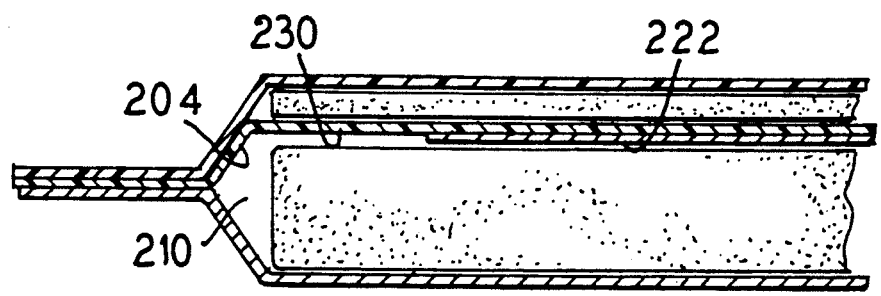
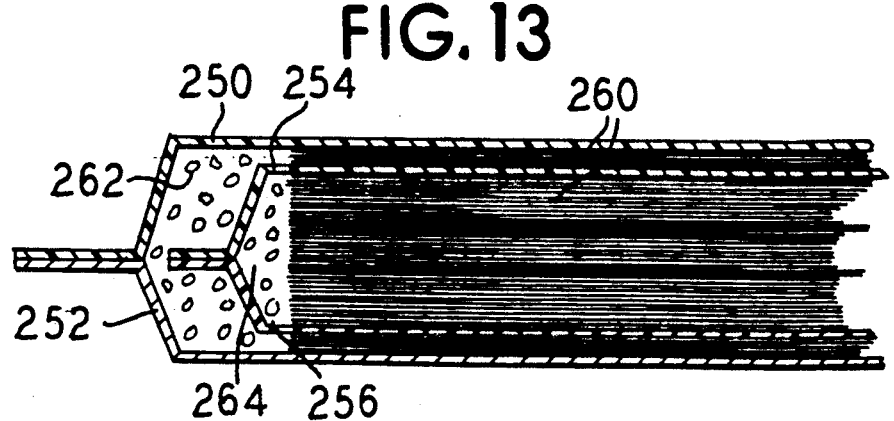

MULTI-COMPARTMENT VACUUM INSULATION PANELS

BACKGROUND OF THE INVENTION

This invention relates to insulation panels, and more particularly to insulation panels comprising an exterior gas impermeable barrier enclosing a microporous filler insulation material that supports the outer walls when atmospheric gases are evacuated from the interior of the panel.

Vacuum insulation panels are known for various uses including use in refrigeration appliances where they greatly enhance the degree of thermal insulation within the cabinet of the appliance. Such panels must remain effective for the life of the appliance, generally a period in excess of 20 years. To do so, the panels must be highly gas impervious, yet must be able to prevent transmission of heat not solely by conduction and radiation through the panels, but also by conduction along the surface of the panels. Further, any gases that do permeate the panel walls in excess of what is tolerable, depending on the panel filler insulation material, must be absorbed or otherwise captured to prevent degradation of the panels which, for insulation purposes, are most effective only when the interiors of the respective panels are evacuated of all gases.

Vacuum insulation panels are known such as that disclosed in U.S. Pat. No. 3,179,549 which discloses a conventional single compartment vacuum thermal insulation panel using a microporous-powder or fibrous filler material.

U.S Pat. No. 2,863,179 discloses a multi-compartment insulation material for refrigerators. An inner bag seals a fibrous material in an insulating gas filled environment, and is intended to prevent the insulating gas from escaping. An outer bag contains the inner bag and an adjacent layer of fibrous insulation. The purpose of the outer bag is to prevent moisture and air from entering the inner bag, and to minimize abrasions caused by handling, however, the inner bag is not shielded from atmospheric pressure.

U.S. Pat. No. 4,529,638 discloses a conventional single compartment vacuum thermal insulation panel. The panel has a composite barrier film and a microporous powder filler.

U.S. Pat. No. 4,669,632 discloses a vacuum thermal insulation panel. U.S. Pat. No. 4,683,702 discloses a vacuum thermal insulation panel having multiple internal compartments to facilitate evacuation of the panel. A permeable interior film layer contains the powder filler in one compartment, and the panel is evacuated through the other compartment. The resulting panel has only one main insulating compartment. The extra compartment does not shield the main compartment from atmospheric pressure.

It is important in the construction of vacuum thermal insulation panels to prevent the vacuum within the panels from being lost due to slight permeability of the walls of the panel. Therefore, as is known in the art, "getter" materials are placed within the panel to absorb various gases including oxygen, water vapor, nitrogen, etc. Use of such getter materials in vacuum insulation panels is known and is disclosed in U.S. Pat. Nos. 4,000,246; 4,444,821; 4,668,551; 4,702,963 and 4,726,974. Each of said patents discloses the use of a getter material in a single compartment of a vacuum insulation panel. A problem resulting from the use of such getter materials is that some getter materials may absorb more than one type of gas and thus may be consumed by a relatively prevalent type of gas, such as water vapor and thus would not be available to absorb other gases, while less expensive materials should be used for absorbing water vapor. Once the getter materials have been consumed, degradation of the panel will begin.

SUMMARY OF THE INVENTION

The present invention provides an improvement in vacuum insulation panels with several unique features. The panels consist of three or more layers of composite barrier films which are sealed together at their edges to form a bag with two or more adjacent compartments. A microporous filler material is placed in each compartment, and the bag is then evacuated of gases and sealed. The resulting panel has a very high resistance to a gas conduction mode of heat transfer as long as the low internal pressure is maintained.

The primary function of the barrier film is to prevent gas and water vapor permeation into the panel, thereby maintaining the desired vacuum level. A barrier film consisting of metal foil laminated plastic films or a composite barrier film consisting of laminated plastic, metallized plastic, and metal foil layers provides superior resistance to permeation by gases and water vapor, largely due to the impermeability of the metal foil layer. The barrier films with metal foil layers have excellent gas and water vapor permeability characteristics when compared to the conventional metallized plastic film laminates. However, the vacuum insulation panels cannot be made using only the metal foil laminated barrier films due to heat transmission from the hot face of the panel to the cold face by conduction around the outside surface of the panel. The typical metal foil thickness of 0.00035 to 0.001 inches provides an excellent heat conduction path and considerable amount of heat gets conducted through the panel surface bypassing the excellent thermal resistance provided by the vacuum insulation medium. However, it is not desirable to eliminate the metal foil layer, due to the increase in gas and water vapor permeation that would result.

To overcome the above problem it is necessary to incorporate a thermal break into the barrier film construction. Also, it is apparent that acceptable panel thermal and lifetime performances can be obtained if most of the panel surface is covered with metal foil laminated barrier films provided that a proper thermal break is designed into the bag at the right locations, as described below. By using a metal foil layer which does not extend all of the way to the edges of the panel, the thermal bridge from the hot side of the panel to the cold side is broken. Specifically, one side of the panel has a metal foil layer extending beyond the edge of the panel. On the other side, a gap, at least one-fourth inch or larger, is provided between the edge of the metal foil and the outer edge of the panel contents. If the vacuum panels are attached to a secondary metal surface, say for insulation of a refrigerator cabinet wall, it is necessary to have the thermal break on the opposite face of the vacuum panel; not on the side facing the secondary metal wall or the thermal break section of the vacuum panel should be protected from the secondary wall by a thermal insulating medium such as foam tape. In addition, the metal foil layer on the panel surface with the thermal break should be on the side of the barrier film facing the inside of the panel.

The barrier film as such may be economically manufactured in a continuous roll. The various layers, some of which may be metallized, are laminated together, and a gap is provided between one edge of the barrier film and the edge of the metal foil layer to create a thermal break on two edges of the panel. Periodic rows of interruptions are cut in the metal foil across the barrier film. This provides a thermal break for the remaining two edges of the vacuum panel.

An alternate method of obtaining a thermal break with a continuous roll barrier film may also be utilized in the present invention. As discussed above, the metal foil layer does not extend to the edges of the barrier film. Two pieces of such a barrier film are cut and one is oriented 90° relative to the other to form a thermal break at each edge of the panel.

Longer effective life for the panel is provided when the panels consist of three or more layers of composite film which are sealed together at their edges to form a bag with multiple coextensive adjacent compartments. A filler insulating material or materials is or are placed in each of the adjacent compartments, and the bag is then evacuated of gases and sealed, forming a plurality of separate vacuum insulation chambers. The resulting panel has a very high resistance to heat transfer as long as the desired vacuum level is maintained.

Although the composite barrier film is selected for its extremely high resistance to permeation by gas and water vapor, the large partial pressure gradients across the outer walls of the panel inevitably cause gases and water vapor to permeate the composite film over time. This causes the internal panel pressure to rise, and results in a lower resistance to heat transfer due to increased gas conduction contribution. Prior vacuum panel insulation provided designs with a conventional single cavity have not been practical for use in domestic refrigeration appliances due to the rapid degradation of the insulation performance.

The present invention provides a solution to this problem in that a main vacuum insulation compartment will contain a large volume of the filler insulation material and act as the primary insulating compartment. One or more coextensive secondary vacuum insulation compartments containing a lesser volume of the filler insulation material, not necessarily the same as in the main compartment, are provided adjacent to the main compartment. The purpose of the secondary compartments is to protect the main compartment, from gas and water vapor permeation. The outer walls of the secondary compartments are still exposed to high pressure gradients, which cause some gas and water vapor permeation into the secondary compartments over time. However, the impermeable wall separating the main compartment from the secondary compartment will be exposed to much lower partial pressure gradients over the life of the panel, thus minimizing the gas and water vapor permeation into the main compartment. This will maintain the vacuum in the main compartment over a much longer time. It is estimated that multi-compartment vacuum insulation panels will maintain good insulation performance over the life of the refrigeration product which is anticipated to be at least twenty years.

Within the multi-compartment vacuum insulation panels, getter materials may also be placed in the sealed compartments to trap any gas or vapor which might permeate through the barrier film. This helps prevent the internal compartment pressures from rising and maintains good thermal insulation performance.

The present invention may employ a getter system, as described in a copending patent application Ser. No. 452,068, entitled "Getter System for Vacuum Panels", filed simultaneously herewith and assigned to the assignee of the present invention, for use in a multi-compartment vacuum panel. In such a multi-compartment panel, a main vacuum compartment will contain a large volume of filler material and act as the primary insulating compartment. One or more secondary compartments containing a lesser volume of the same or another filler material are provided adjacent to the main compartment as indicated above.

It is advantageous to provide a relatively inexpensive water vapor getter, such as anhydrous calcium sulfate, in the secondary compartments, and an optional more expensive reactive metal gas getter in the main compartment. The water vapor getter in the secondary compartment prevents water vapor from consuming the reactive metal gas getter in the main compartment, thus increasing the useful life of the gas getter and the life of the vacuum panel.

BRIEF DESCRIPTION OF THE DRAWINGS

FIG. 5A is a perspective view of the assembly of a web of film material.

FIG. 5B is a perspective view showing assembly of two pieces of film web together.

FIG. 5C is a perspective view of the assembled webs of 5B.

FIG. 6 is a side sectional view of an embodiment of a vacuum insulation panel embodying the principles of the present invention.

FIG. 7 is a side sectional view of an embodiment of a vacuum insulation panel embodying the principles of the present invention.

FIG. 8 is a side sectional view of an embodiment of a vacuum insulation panel embodying the principles of the present invention.

FIG. 9 is a side sectional view of an embodiment of a vacuum insulation panel embodying the principles of the present invention.

FIG. 01 is a side sectional view of an embodiment of a vacuum insulation panel embodying the principles of the present invention.

FIG. 11 is a side sectional view of an embodiment of a vacuum insulation panel embodying the principles of the present invention.

FIG. 12 is a side sectional view of an embodiment of a vacuum insulation panel embodying the principles of the present invention.

FIG. 13 is a side sectional view of an embodiment of a vacuum insulation panel embodying the principles of the present invention.

DESCRIPTION OF THE PREFERRED EMBODIMENTS

Although the vacuum insulation panels of the present invention can be used in a wide variety of environments to prevent transfer of heat from a relatively hot area to a relatively cold area, the panels find particular utility in a refrigeration appliance, and therefore to the extent that this invention is described in a particular environment, it will be in a refrigeration appliance, however, it should be understood that the invention is not limited to such use.

Figure 1:
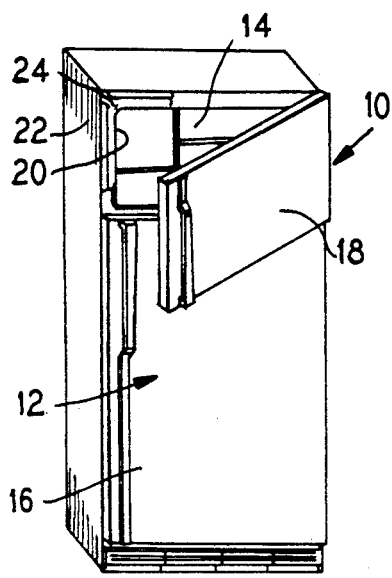
FIG. 1 is a perspective view of a refrigeration appliance illustrating the use of a vacuum thermal insulation panel embodying the principles of the present invention.

In FIG. 1 there is illustrated a refrigeration appliance generally at 10 which comprises a refrigerator compartment 12 and a freezer compartment 14 located above the refrigerator compartment 12. Of course other refrigeration appliances such as those having only a refrigerator compartment or only a freezer compartment or different arrangements of refrigerator and freezer compartments could employ the present invention. The particular refrigeration appliance illustrated is only a single example of a type of refrigeration appliance that could utilize the present invention. Otherwise environments having a hot side and a cold side could also benefit from the use of the present invention.

Figure 2:
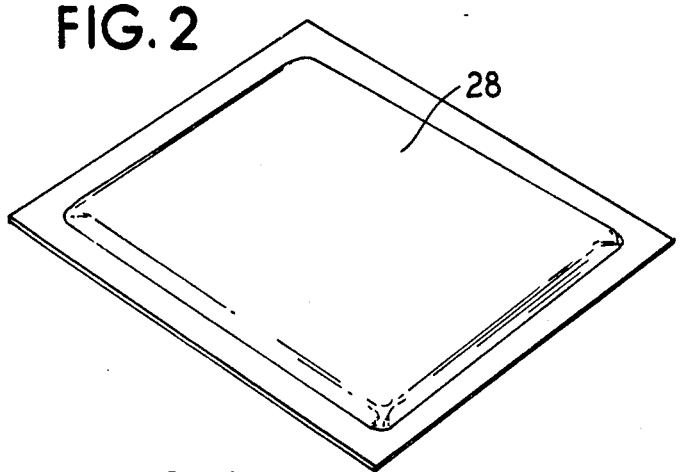
FIG. 2 is a perspective view of a vacuum insulation panel embodying the principles of the present invention.

Each of the compartments 12, 14 is accessed by means of a separate door 16, 18. The compartments are defined by an interior liner wall 20 which is spaced within an exterior outer shell 22, comprising the refrigeration appliance cabinet. A space 24 between the liner and the shell is normally filled with an insulation material 26 (FIG. 4A) such as polyurethane foam which is injected into the space 24 in a liquid state where it expands and hardens into a porous solid state to form a structural part of the cabinet as well as providing a thermal barrier necessary to prevent rapid warming of the interior compartments. The present invention provides an improved vacuum insulation panel 28 (FIG. 2) which is to be inserted in the space 24 between the liner 20 and the shell 22 to enhance the insulation property of the insulation systems. Polyurethane foam 26 is also used in the system to provide additional insulation, the structural support it normally provides and to assist in holding the panels 28 in place between the walls 20, 22.

The particular placing and usage of such vacuum panels is disclosed in a co-pending patent application Ser. No. 452,063 entitled "VACUUM INSULATION SYSTEM FOR INSULATING REFRIGERATION CABINETS", filed simultaneously herewith and assigned to the same assignee as the present invention, and further discussion of the use of such panels will not be contained herein.

Figure 3:
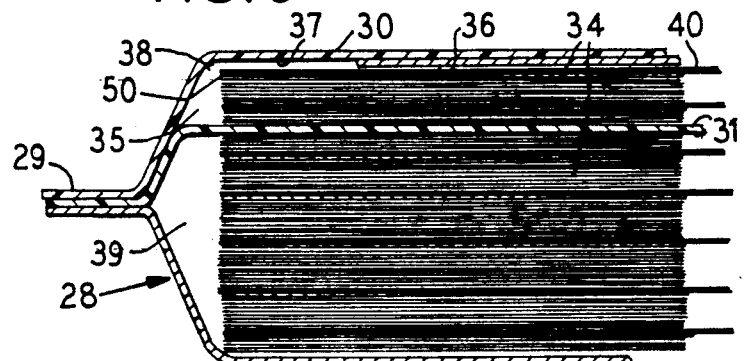
FIG. 3 is a side sectional view of a two-compartment vacuum insulation panel illustrating the principles of the present invention.

Each of the vacuum insulation panels 28 is constructed with a pair of gas impermeable outer film walls 30, 32 (FIG. 3) and at least one gas impermeable inner wall 31 to form at least two adjacent compartments 35, 39 (FIG. 3) enclosing one or more microporous filler insulation materials 34 that support the film walls 30, 31, 32 of the panel when atmospheric gases are evacuated from the interior compartments 35, 39 of the panel. The pressure differential across film wall 31 is very small, while the pressure differential across either of the outer walls 30 and 32 will be approximately equal to atmospheric pressure. The microporous filler material(s) 34 may be in a form of individual sheets of fibrous material such as glass fiber insulation as illustrated in FIG. 3 or, may be in the form of microporous powder material as illustrated in FIG. 6. Of course, any other form and combination of microporous or other porous filler insulation materials may be employed in the various compartments of the present invention. The two outer walls 30, 32 and one inner wall 31 (FIG. 3) or more, are hermetically sealed to each other about their outer edges or periphery 29 to define at least two vacuum seal compartments 35, 39 (FIG. 3) or more. The primary function of the compartment walls 30, 31, 32 made of flexible barrier films is to prevent gas and water vapor permeation into the vacuum panel 28, thereby maintaining the proper vacuum level achieved during its manufacture through evacuation prior to the sealing of the peripheral edges of the panel to form the vacuum insulation compartments. The barrier film comprising an outer layer of metallized or non-metallized plastic laminates and a layer of metal foil 36 laminated to the inner surface 37 of the metallized or non-metallized plastic laminate barrier film has the best permeability characteristics, that is, will maintain the vacuum conditions within the panel for the longest period of time. However, such metal foil laminated barrier films transmit heat along their length and thus it becomes necessary to provide a thermal break in the form of a spacing or gap 38 in the metal film 36, preferably on the order of one quarter inch or larger to prevent the conduction of heat around the exterior of the panel 28 from the hot to the cold side of the panel.

To manufacture the panels with a thermal break in an economical manner, as described in the copending patent application Ser. No. 452,063, entitled "Vacuum Insulation System for Insulating Refrigeration Cabinets," the method disclosed herein may be utilized. As illustrated in FIG. 5A, preferably the barrier film 30 is manufactured in a continuous roll. Various layers are laminated together and the gap 38 is provided between lateral edges 44, 46 of the roll or web of film 30 and lateral edges 40, 48 of the metal foil layer 36 which is applied directly to and laminated to the film web 30. Periodic rows of interruptions 52 may be provided along the length of the foil so as to provide a break between adjacent foil strips. These interruptions would then appear at the edges of the cut sheets.

An alternate method of obtaining a thermal break with a continuous roll of barrier film 30 is illustrated in FIGS. 5B and 5C wherein the metal foil 36 is laminated directly to the film roll, with its lateral edges 40, 48 spaced inwardly of the lateral edges 44, 46 of the film. Generally square pieces are severed from the film and are joined to one another with one of the square pieces rotated 90° relative to each other. Thus, the gap portions 38 will form all four edges of the final assembled panel as illustrated in FIG. 5C. Webs of different widths could be utilized if it is desired to construct rectangular panels that are not square.

In order to prevent transmission of heat by radiation, in the present invention it has been determined that it is useful to provide layers of highly reflective material such as metallized plastic film or metallic foil 40 within the multilayered fiber paper material 34 so that infrared radiation is reflected rather than transmitted through the panel 28. These radiation shields do not deliver or remove any heat from the overall vacuum panel system;

rather they place additional resistance in the heat-flow path so that the overall vacuum panel heat transfer is further retarded. For microporous powder insulation fillers 34 as in FIG. 6, an opacifying powder additive dispersed uniformly into the filler insulation material 34 would serve the same purpose.

Referring back to FIG. 3, it is necessary to provide within the sealed panels 28 materials to absorb or otherwise interact with gases and vapors that are able to slowly permeate the film walls 30, 32 of the panel. Such materials are known as getters and may include, for example, a granular form of calcium sulfate (CaSO$_4$) which is excellent in removing water vapor, as well as other getter materials such as ST707 (a zirconium-vanadium-iron alloy) or barium which facilitates in removal of gases such as nitrogen and oxygen. Activated charcoal shown in layer form 50 in FIG. 3 is also useful in removing organic vapors. Getter materials for use in the present invention are described in more detail in the copending application, Ser. No. 452,068, entitled "Getter System for Vacuum Panels".

Figure 4A:
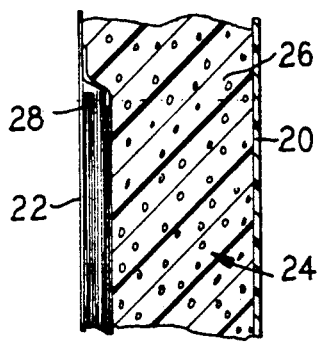
FIG. 4A is a sectional view showing placement of a vacuum insulation panel within a refrigeration appliance.
Figure 4B:
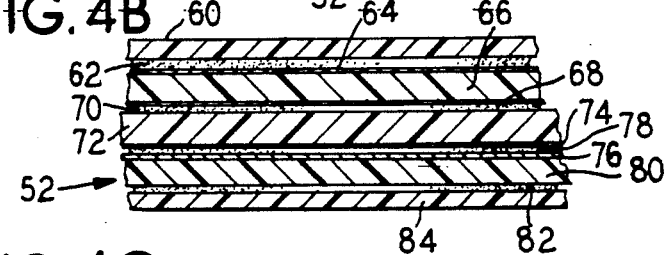
FIG. 4B is an enlarged sectional view of one wall portion of the vacuum insulation panel.
Figure 4C:
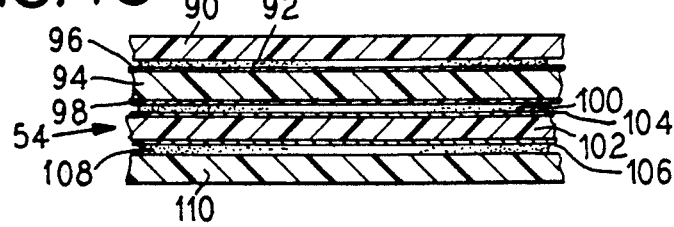
FIG. 4C is an enlarged sectional view of a second wall portion of the vacuum insulation panel.
Figure 4D:
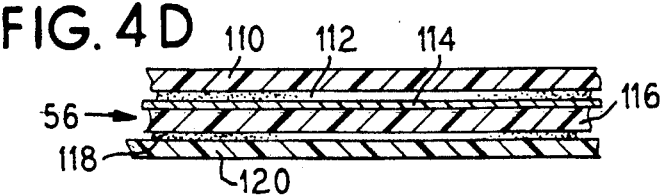
FIG. 4D is an enlarged seCtional view of a third wall portion of the vacuum insulation panel.

FIG. 4A illustrates a panel 28 held in place by polyurethane foam 26 and illustrates three different wall portions 52, 54 and 56 of the panel 28 and three types of flexible barrier films shown in greater detail in FIGS. 4B, 4C and 4D respectively.

The first film or wall portion 52 is illustrated in FIG. 4B which may comprise an outer clear plastic protective coating 60, an adhesive layer 62, a layer of vapor deposited aluminum (500-1,000 angstroms thick), all on one side of a mylar (Pet) layer 66. Another layer of vapor deposited aluminum 68 is applied to an opposite face of the mylar and then an adhesive layer 70 is applied to another mylar layer 72. A further vapor deposited aluminum layer 74 is applied to an opposite face of the mylar layer 72. An adhesive layer 76 secures vapor deposited aluminum layer 74 to an aluminum foil layer 78 (preferably 0.00035 to 0.001 inches thick). Another mylar layer 80 follows. An adhesive layer 82 holds on an outer layer 84 which is a suitable heat sealable material. This type of barrier film is a composite of metallized and aluminum foil laminated plastic barrier films.

The second wall portion 54 comprises a laminated metallized plastic film which has an upper surface layer 90 of a clear plastic protective coating. Adhesive layer 92 secures the outer layer to a layer of mylar 94 in the form which has a layer of vapor deposited aluminum 96 and 98 on each side thereof. A layer of adhesive 100 secures this to a second mylar sheet 102 which again has a layer of vapor deposited aluminum 104, 106 on each face thereof. A vinyl adhesive layer 108 is used to laminate the above to a heat sealable layer 110. This wall portion 54 differs from that of portion 52 primarily in the area of the removal of the aluminum foil layer 76 of wall portion 52. This is necessary as described above to provide a thermal break to prevent edge conduction in the vacuum panel. The aluminum foil thickness of .001 inches provides an excellent conduction path and a considerable amount of heat gets conducted from the hot face to the cold face of the panel through the foil width, bypassing the thermal insulation, if such a thermal break is not provided.

The use of a wall portion such as 54 for the entire bag or panel would not be possible in that the barrier characteristics or permeability of such a film is not good enough to provide the desired 20 year panel lifetime.

The wall portion 56 illustrated in FIG. 4D includes an outer clear plastic layer 110 secured by an adhesive layer 112 to an aluminum foil layer 114. Such aluminum foil is adhered to a mylar layer 116 which is secured by an adhesive layer 118 to a heat sealable layer 120. Thus, this final barrier film wall portion 56 also includes an aluminum foil layer which provides superior permeability characteristics to enhance the life of the panel. This type of barrier film basically represents a metal foil laminated plastic barrier film.

As is apparent from the foregoing, three general types of flexible barrier films, namely 52, 54, and 56, can be constructed with various alterations and different combinations of layers as long as the film distinctions are maintained.

It has been determined that one can obtain acceptable thermal and lifetime performances if most of the panel surface is covered with either of the film types shown by panel portions 52 and 56 which are provided with the metal foil, provided that a thermal break is designed into the panel at the right locations. As described above, in conceiving the present invention it has been determined that such a thermal break should have a dimension of 0.25 inch or larger depending upon the thickness of the panel and the type of microporous material carried within the panel.

A longer effective life for a panel is provided when the panel consists of three or more layers of composite film which are sealed together at their edges to form a bag with multiple adjacent compartments. For example, shown in FIG. 7 is a panel 150 having four separate film layers 152, 154, 156 and 158 which define three separate interior compartments 160, 162 and 164.

A microporous filler material 166 or any porous insulating material is provided in each of the adjacent compartments 160, 162, 164, and the bag is then evacuated of gases and sealed along periphery portion 168 to form a plurality of separate vacuum chambers. The filler insulation materials for the respective compartments do not necessarily have to be the same kind for each compartment. The compartments may even have mixtures of various filler insulation materials. The resulting panel has a very high resistance to transmission of heat as long as the desired vacuum level is maintained for a given filler insulation material.

Preferably the film layer 158 has an aluminum foil laminated thereto to provide the low permeability characteristics described above. Each of the other walls may be comprised of a barrier film merely having a metallized layer therein, however, it is shown that the top layer 152 has an aluminum foil portion 170 secured thereto, yet providing a thermal break area 172 as described above. Thus, the permeability characteristics of this panel remain very low.

The use of multiple compartments greatly enhances the effective insulation lifetime of the main compartment 162 in that the pressure gradient across the outer walls 152, 158 remains virtually one atmosphere of pressure while the pressure differential across the inner walls 154, 156 is very low. Since permeation is directly related to the pressure differential across the wall, even if there is some slight permeation of the outer walls 152, 158 the main compartment 156 will have a much longer life in that the amount of permeation through its walls will remain low.

FIG. 8 illustrates an alternative embodiment of the three compartment construction wherein the aluminum foil layer 170 is applied to the inner bag wall 154 rather than the outer wall 152 as shown in FIG. 7.

FIG. 9 illustrates yet a further embodiment wherein no foil layer is applied to any wall, all walls merely being of a metallized barrier film, which is a less expensive film and the use of multiple compartments provides the necessary barriers.

FIG. 10 illustrates an embodiment of the panel 200 comprising three film layers 202, 204 and 206 which define two internal compartments 208, 210. Compartment 210 is the main compartment, however both compartments are filled with a microporous filler material 212. Again, use of multiple chambers or compartments provides an increased lifetime and reduces the permeation of gases and vapors into the main compartment 210. The wall 206 can be an aluminum foil laminated plastic film which, as described above, provides great permeability characteristics and the walls 202 and 204 will provide a sufficient barrier against permeation, particularly due to the low pressure gradient across the interior wall 204.

FIG. 11 illustrates an alternative embodiment of a panel 220 wherein an aluminum foil layer 222 is applied to an interior surface 224 of the outer layer 202 to enhance the permeability characteristics of the panel 220. As described above, a thermal break 226 is provided.

FIG. 12 illustrates an alternative embodiment wherein the aluminum foil layer 222 is applied to an interior surface 230 of the interior wall 204 to prevent permeation into the main compartment 210.

FIG. 13 illustrates yet a further embodiment of the present invention wherein four separate layers 250, 252, 254 an 256 are formed and comprise two completely independent sealed bags, an outer bag formed of film layers 250, 252 which completely encapsulates and surrounds an internal bag formed by film layers 254 and 256. Within each bag there is provided a microporous filler material 260 and also various gettering materials 262 are provided.

Another advantage to using multiple compartment panels is that, if desired, the gettering materials can be arranged to provide isolation of two competing gettering materials as described in the copending patent application Ser. No. 452,068, entitled "Getter System for Vacuum Panels". For example if barium is being used as an oxygen and nitrogen absorber, since it reacts quickly to water vapor and does not need water vapor to function to absorb oxygen and nitrogen, it would be advantageous to use the calcium sulfate gettering material 228 in the outer compartment(s) and a barium gettering material 229 in the main compartment. Since barium is much more expensive than calcium sulfate, it is much more desirable to use the calcium sulfate to react with the water vapor rather than the barium.

Also, as shown in FIG. 13, again an inexpensive desiccant gettering material 262 could be provided in the outer compartment while a more expensive reactive metal gettering material 264 would be provided in the interior compartment.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A vacuum thermal insulation panel comprising:
   a first outer wall;
   a second outer wall coextensive and parallel with said first outer wall;
   at least one internal wall coextensive and parallel with said outer walls, interposed between said first outer wall and said second outer wall and hermetically sealed together with said first outer wall and said second outer wall about their perimeters;
   a first compartment being evacuated and containing a predetermined amount of a microporous insulating material, said compartment being defined by an internal wall and one of said outer walls, with the pressure differential across said internal wall being very small; and
   a second compartment being evacuated and containing a predetermined amount of a microporous insulating material, said second compartment being defined by an internal wall and the other of said outer walls, with the pressure differential across said outer wall being approximately equal to atmospheric pressure.

2. A vacuum thermal insulation panel according to claim 1, including a plurality of internal walls coextensive and parallel with said outer walls and at least one third compartment being evacuated and containing a predetermined amount of microporous said internal walls, with the pressure differential across said internal walls being very small.

3. A vacuum thermal insulation panel according to claim 1, wherein said walls comprise multiple layers of flexible, gas impermeable material, and at least one of said walls includes a metallic foil layer.

4. A vacuum thermal insulation panel according to claim 3, wherein said metallic foil layer is an aluminum foil layer having a thickness of 0.00035 to 0.001 inches.

5. A vacuum thermal insulation panel according to claim 3, wherein said wall with said metallic foil layer is an outer wall.

6. A vacuum insulation panel according to claim 3, wherein said at least one wall with said metallic foil layer is two outer walls, a first outer wall having a first layer of metal foil and a second outer wall having a second layer of metal foil, with at least one of said wall comprising:
   a layer of metal foil laminated to an inner side of said plastic film, wherein said layer of metal foil terminates 0.25 or more inches from an edge of said outer surface of said vacuum thermal insulation panel, thereby forming a thermal break to prevent heat conduction from a warmer side to a colder side of said vacuum insulation panel through said first and second layers of metal foil.

7. A vacuum thermal insulation panel according to claim 3, wherein said at least one wall with said metallic foil layer is an internal wall comprising:
   a layer of metal foil laminated to an inner side of said plastic film, wherein said layer of metal foil terminates 0.25 or more inches from an edge of said outer surface of said vacuum thermal insulation panel, thereby forming a thermal break to prevent heat conduction from a warmer side to a colder side of said vacuum insulation panel through said first and second layers of metal foil.

8. A vacuum thermal insulation panel according to claim 7, further comprising moisture absorbing material disposed in said second compartment and gas absorbing material disposed in said first compartment.

9. A multi-compartment vacuum thermal insulation panel comprising:
   a first outer layer of flexible gas-impermeable film;
   a second outer layer of flexible gas-impermeable film coextensive and parallel with said first outer layer;
   first and second internal permeable film coextensive and parallel with said outer layers interposed between said first outer layer and said second outer layer and hermetically sealed together with said first outer layer and said second outer layer about their perimeters;
   a first compartment being evacuated and containing a predetermined amount of a microporous insulating material, said compartment being defined by said first internal layer and said second internal layer; and
   two secondary compartments being evacuated and containing a predetermined amount of a microporous insulating material, each of said secondary compartments being defined by one of said internal layers and one of said outer layers, with the pressure differential across each of said outer layers being approximately equal to atmospheric pressure, and the pressure differential across each of said internal layers being very small.

10. A vacuum thermal insulation panel according to claim 9 further comprising:
    a relatively inexpensive moisture gettering material disposed in each of said secondary compartments for absorbing any moisture which permeates through said outer layers; and
    a gas gettering material disposed in said first compartment for absorbing any gases which permeate through said internal layers.

11. A vacuum thermal insulation panel according to claim 9, wherein said walls comprise multiple layers of flexible, gas impermeable material, and at least one of said walls includes a metallic foil layer.

12. A vacuum thermal insulation panel according to claim 9, wherein said metallic foil layer is an aluminum foil layer having a thickness of approximately 0.00035 to 0.001 inches.

13. A vacuum thermal insulation panel according to claim 11, wherein said wall with said metallic foil layer is an outer wall.

14. A vacuum thermal insulation panel according to claim 11, wherein said wall with said metallic foil layer is an inner wall.

15. A vacuum insulation panel according to claim 11, wherein said at least one wall with said metallic foil layer is two outer walls with at least one of said walls comprising:
    a layer of metal foil laminated to an inner side of said plastic film, wherein said layer of metal foil terminates 0.25 or more inches from an edge of said outer surface of said vacuum thermal insulation panel, thereby forming a thermal break to prevent heat conduction from a warmer side to a colder side of said vacuum insulation panel through said first and second layers of metal foil.

16. A vacuum thermal insulation panel to be interposed between a warm area and a cold area thus defining a warmer side and a colder side of said panel, wherein plural layers of barrier film are sealed together about their peripheries to form at least one hermetically sealed compartment, said compartment being filled with a microporous insulating material and evacuated of atmospheric gases, said vacuum thermal insulation panel comprising:
    a first layer of metal foil coextensive with the barrier film on one side of said vacuum thermal insulation panel;
    a layer of flexible plastic film barrier laminate forming the outer surface on the other side of said vacuum thermal insulation panel; and
    a second layer of metal foil laminated to the inner side of said plastic barrier film laminate, wherein said layer of metal foil terminates at least 0.25 inches from the edge of said outer surface of said vacuum thermal insulation panel, thereby forming a thermal break to prevent heat conduction from said warmer side to said colder side of said vacuum thermal insulation panel through said first and second layers of metal foil.

17. A vacuum thermal insulation panel according to claim 16, wherein at least three layers of barrier film are sealed together about their peripheries forming at least two hermetically sealed compartments, each compartment being filled with a microporous insulating material and evacuated of atmospheric gases.

18. A vacuum thermal insulation panel for insulating a domestic refrigerator wherein plural layers of barrier film are sealed together about their peripheries to form at least one hermetically sealed compartment, said compartment being filled with a microporous insulating material and evacuated of atmospheric gases, said vacuum thermal insulation panel comprising:
    a first layer of barrier film comprising a layer of flexible plastic barrier film laminate forming the outer surface of said barrier film, and a layer of metal foil laminated to the inner side of said plastic film laminate, wherein said layer of metal foil terminates at least 0.25 inches from the edge of two opposite sides of said outer surface of said vacuum thermal insulation panel thereby forming a thermal break on two edges, and said layer of metal foil terminates at the edge of the remaining two sides of said vacuum thermal insulation panel; and
    a second layer of barrier film similar to said first layer and sealed to said first layer about their peripheries to form a sealed compartment, said second layer rotated 90° with respect to said first layer such that a thermal break is disposed on each edge of said vacuum thermal insulation panel.

* * * * *